United States Patent [19]
Johnson

[11] 4,253,603
[45] Mar. 3, 1981

[54] TEMPERATURE RESPONSIVE CONTROL APPARATUS

[75] Inventor: Bruce A. Johnson, Rockford, Ill.

[73] Assignee: Woodward Governor Company, Rockford, Ill.

[21] Appl. No.: 4,701

[22] Filed: Jan. 19, 1979

[51] Int. Cl.³ .................................... G05D 23/12
[52] U.S. Cl. .................................... 236/86; 137/85; 91/388; 236/82
[58] Field of Search ............... 236/86, 82; 137/85; 91/388

[56] References Cited
U.S. PATENT DOCUMENTS

| | | | |
|---|---|---|---|
| 3,023,763 | 3/1962 | Lanctot | 137/85 |
| 3,085,556 | 4/1963 | Peczkowski | 137/85 X |
| 3,096,690 | 7/1963 | Hayner | 137/85 X |
| 3,322,344 | 5/1967 | Peczkowski et al. | 236/86 |
| 3,324,738 | 6/1967 | Olsen et al. | 137/85 X |
| 3,861,588 | 1/1975 | Bata et al. | 137/85 X |
| 3,899,002 | 8/1975 | Hayner | 137/85 X |
| 3,978,876 | 9/1976 | Stevenson et al. | 137/85 X |
| 4,017,027 | 4/1977 | Smith | 236/99 E |

Primary Examiner—Albert J. Makay
Assistant Examiner—William E. Tapolcai, Jr.
Attorney, Agent, or Firm—Leydig, Voit, Osann, Mayer & Holt, Ltd.

[57] ABSTRACT

A detector for sensing the compressor inlet temperature of a gas turbine engine and for producing an output pressure signal which is used by the fuel control of the engine. The magnitude of the output signal is determined by the position of a valve which changes positions in response to changes in temperature. The response time of the detector is made faster by causing a feedback pressure which acts on the valve to initially change at a slower rate than the output pressure (i.e., to lag the output pressure) when the output pressure changes as a result of temperature variations. The invention can be incorporated either in a self-contained sensor or in an add-on unit which can be retrofitted to existing sensors having relatively slow response characteristics.

16 Claims, 3 Drawing Figures

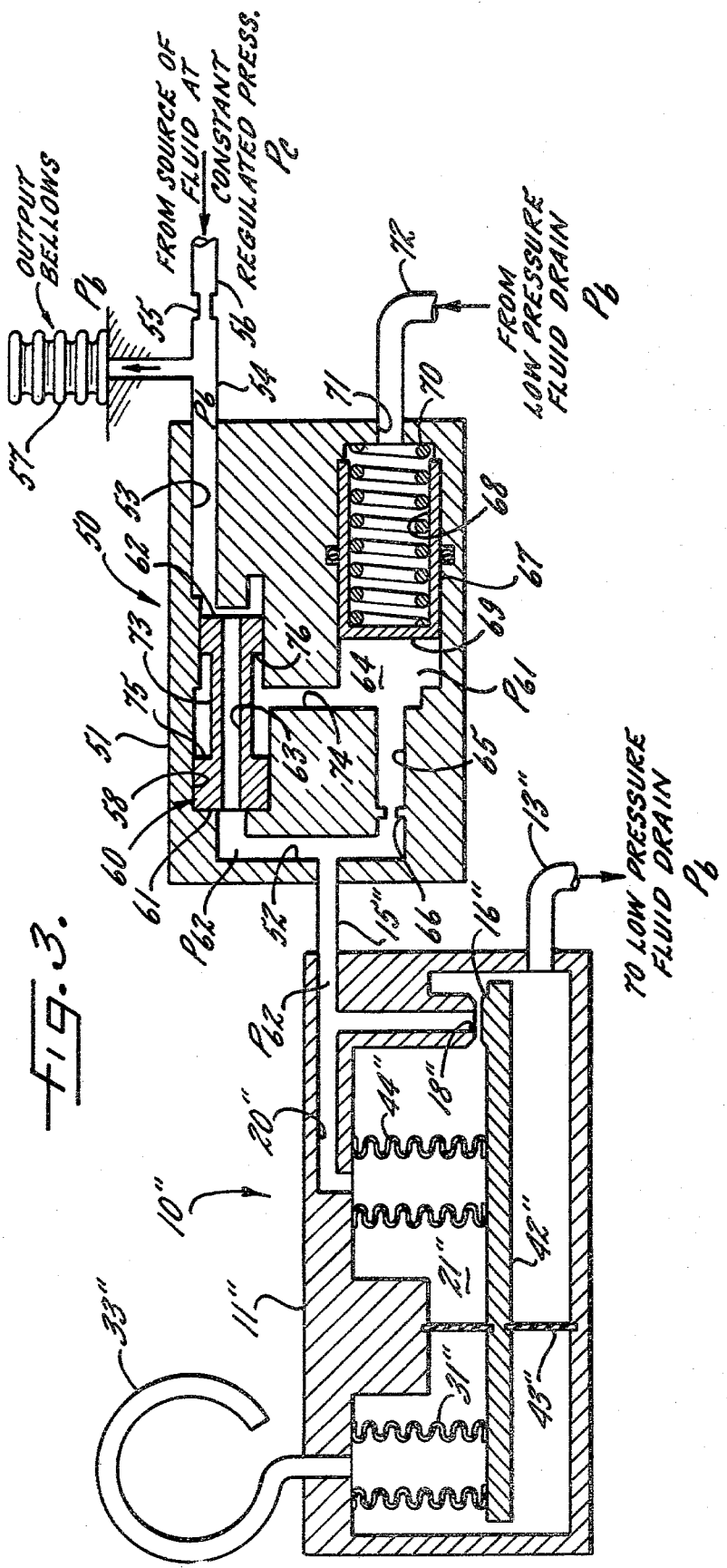

TEMPERATURE RESPONSIVE CONTROL APPARATUS

BACKGROUND OF THE INVENTION

This invention relates generally to temperature responsive control apparatus and more specifically to control apparatus in which an input fluid pressure signal which varies as a function of temperature is amplified and is converted to an output pressure signal or equivalent position signal for control purposes.

Typically, the input pressure signal is produced by the expansion and contraction of a gas contained within a bulb or probe which senses a variable temperature condition while the output pressure signal is produced hydraulically. When conventional temperature responsive control apparatus is used in certain applications as, for example, a fuel control for a gas turbine engine, the time delay or lag between a change in the sensed temperature and a change in the output signal is too great to enable adequate control over the rate of fuel flow to the engine.

It has been recognized that the response characteristics of the control apparatus should be as fast as possible. One scheme for decreasing the response time is disclosed in Peczkowski U.S. Pat. No. 3,322,344. In that arrangement, the gas from the probe is transmitted to a receiver and acts in one direction against a valve which controls the output pressure. A hydraulic feedback pressure of the same magnitude as the output pressure acts against the valve in the opposite direction. To improve the response characteristics, the gas from the probe passes through a restriction in the receiver and causes the input pressure signal to change values at a different rate from the rate actually produced by a change in sensed temperature.

SUMMARY OF THE INVENTION

The general aim of the present invention is to provide new and improved temperature responsive control apparatus which possesses improved response characteristics and which, at the same time, is more accurate and trouble-free in operation than prior apparatus of the same general type.

A more detailed object is to achieve the foregoing by providing unique apparatus in which the response time is decreased by retarding changes in the hydraulic feedback pressure which acts against the valve so as to cause the output pressure to lead the feedback pressure when a temperature variation occurs. As a result of retarding the hydraulic feedback pressure to improve the response time, the apparatus is less likely to fail in operation since the need for extremely small flow restrictions which are subject to clogging is avoided. In addition, the ratio of the volume of gas in the probe to the volume of gas in the receiver which is associated with the probe can be kept relatively high so as to reduce the effect on the apparatus of variations in temperature different from the sensed temperature.

The invention also resides in the novel manner in which changes in the feedback pressure are retarded.

A further object of the invention is to provide fast responding control apparatus which can either be built as a self-contained unit or which can be retrofitted with conventional existing apparatus to improve the response time thereof.

These and other objects and advantages of the invention will become more apparent from the following detailed description when taken in conjunction with the accompanying drawings.

BRIEF DESCRIPTION OF THE DRAWINGS

FIG. 3 is a view similar to FIG. 1 but shows control apparatus which may be retrofitted to presently used apparatus to decrease the response time thereof.

DETAILED DESCRIPTION OF THE PREFERRED EMBODIMENTS

Figure 1:
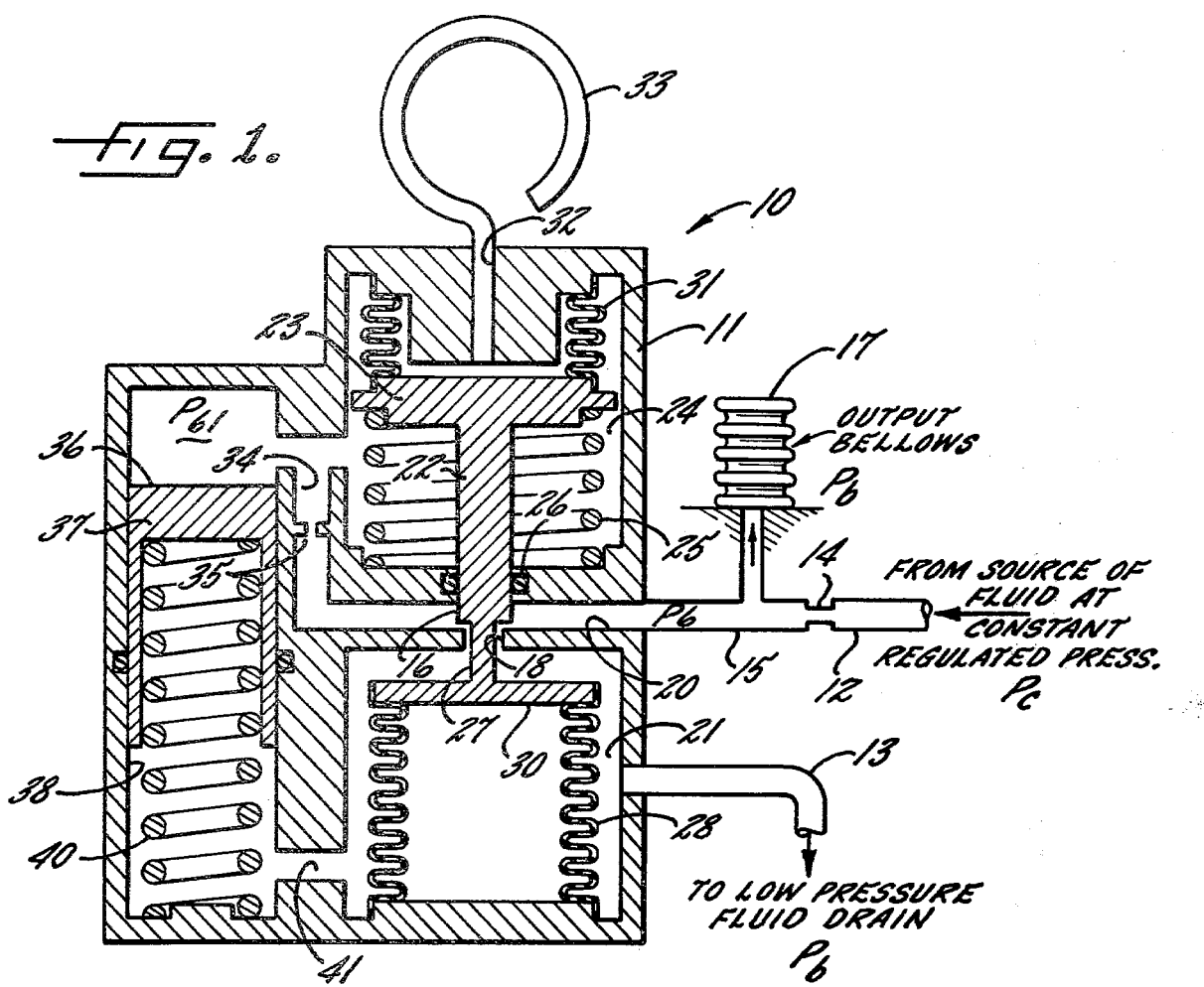
FIG. 1 is a cross-sectional view showing one embodiment of new and improved temperature responsive control apparatus incorporating the unique features of the present invention.

As shown in the drawings for purposes of illustration, the invention is embodied in temperature responsive control apparatus 10 which, in the present instance, is a sensor for detecting the compressor inlet temperature of a gas turbine engine (not shown) and for producing an output signal which varies as a function of such temperature. The output signal is used by a fuel control (not shown) for regulating the rate of fuel flow to the engine and is specifically used for establishing an acceleration or deceleration limit schedule and/or for positioning the variable stators of the engine. It will be appreciated, however, that the sensor 10 could detect the temperature of any other gas stream of the engine (e.g., the fan discharge temperature) and could be used in applications other than fuel controls.

Herein, the sensor 10 includes a casing 11 adapted to communicate with two lines 12 and 13. The line 12 extends from a source of pressure fluid at a constant regulated pressure $P_c$. Such pressure fluid may be fuel tapped from a suitable high pressure fuel source and reduced in pressure by a suitable constant pressure regulator. The line 13 is vented to a low pressure source as a fuel pump inlet or the like and resides at a pressure $P_b$ which acts as a system reference pressure. The pressure $P_c$ is constantly maintained at a predetermined magnitude (e.g., 200 p.s.i.) above the pressure $P_b$.

In order to derive a control signal from the sensor 10, the line 12 communicates with the casing 11 by way of a restriction 14 and a line 15. The pressure $P_6$ in the line 15 constitutes a control signal and its magnitude varies in accordance with the position of a valve 16. An output bellows 17 is shown as communicating with the line 15 and serves to convert the pressure signal $P_6$ to a force or position signal which may be used by the fuel control to set engine variables as a function of changes in the temperature detected by the sensor. The bellows 17 is exposed externally to the drain pressure $P_b$ and is merely a schematic representation of a member which may respond to the control pressure $P_6$.

The valve 16 controls the flow of pressure fluid through a port 18 which establishes communication between a horizontal passage 20 and a chamber 21 in the casing 11, the passage communicating with the line 15. In the present instance, the valve 16 is defined by the lower end portion of a vertical rod 22 whose upper end is joined to a piston 23 slidably mounted in a chamber 24 in the casing 11 and urged upwardly by a coil spring 25 compressed between the casing and the underside of the piston. The rod 22 is sealed to the casing by an O-ring 26 and includes a reduced diameter lower stem 27 which extends through the port 18 and into the lower chamber 21, the latter communicating with the line 13 and being maintained at drain pressure $P_b$. A bellows 28 in the chamber 21 is sealed between the casing 11 and a disc 30 on the lower end of the stem 27 and is either evacuated or filled with a suitable gas.

Sealed between the casing 11 and the upper side of the piston 23 is still another bellows 31 whose interior communicates by way of a passage 32 in the casing with a probe or tube 33. The tube is of fixed volume and is filled with a fluid source such as helium or other suitable gas which, in accordance with Charles' gas law, will generate a pressure directly proportional to the temperature to which the tube is exposed. In the present sensor 10, the tube is exposed to the gas stream at the inlet of the compressor of the engine and thus the pressure of the gas in the tube and the bellows 31 changes as a function of variations in compressor inlet temperature.

The downward pressure exerted on the upper side of the piston 23 by the gas in the bellows 31 is opposed by a feedback pressure which exists in the chamber 24 by virtue of the chamber communicating with the passage 20 via a vertical passage 34 in the casing 11. When the compressor inlet temperature is at a steady state value, the opposing pressures hold the valve 16 in a fixed and partially open position so that pressure fluid in the passage 20 is metered through the port 18 to the drain line 13 with a fixed pressure drop. The control pressure $P_6$ in the passage 20 and the line 15 thus is maintained at a fixed magnitude which is determined by the position of the valve 16. If the compressor inlet temperature decreases, the reduced pressure on the upper side of the piston 23 causes the valve 16 to move upwardly and open more widely to reduce the control pressure $P_6$ in the passage 20 and the line 15 and also to reduce the feedback pressure in the chamber 24. Conversely, an increase in compressor inlet temperature results in the valve moving downwardly to a more nearly closed position to increase the control pressure $P_6$ in the passage 20 and the line 15. As the control pressure $P_6$ increases, the feedback pressure in the chamber 24 also increases and tends to open the valve 16, the valve ultimately coming to rest in a position in which the downward force exerted by the gas in the bellows 31 is balanced by the sum of the upward forces exerted by the feedback pressure and the spring 25.

In accordance with the present invention, the time required for the control pressure $P_6$ to respond to a change in sensed temperature is reduced by retarding changes in the feedback pressure $P_{61}$ in the chamber 24 to cause the control pressure $P_6$ to lead the feedback pressure $P_{61}$ during a transient condition resulting from a temperature change. In this way, the control pressure $P_6$ reaches its new steady state value more quickly so as to reduce the time constant of the sensor 10.

More specifically, the foregoing is achieved by (i) building a restriction 35 into the passage 34 and (ii) uniquely constructing the chamber 24 to permit flow to occur between the chamber 24 and the passage 20 by way of the restriction 35 when the control pressure $P_6$ changes as a result of movement of the valve 16. By virtue of the chamber 24 permitting flow to occur through the restriction 35, a pressure differential is created across the restriction between the control pressure $P_6$ in the passage 20 and the feedback pressure $P_{61}$ in the chamber 24 to cause the feedback pressure to lag the control pressure $P_6$ and thereby retard the restoring force imposed on the valve 16 by the feedback pressure.

In the present instance, flow is permitted to occur between the chamber 24 and the passage 20 by constructing the chamber with a movable wall 36 so that the volume of the chamber can change when the pressure therein tends to change. Herein, the movable wall 36 of the chamber 24 is formed by the upper face of a vertical piston 37 which is slidably mounted in a cavity 38 in the casing 11 and which is biased in a downward direction by the feedback pressure $P_{61}$ in the chamber 24. A coil spring 40 is compressed between the piston 37 and the casing 11 and urges the piston in an upward direction. In addition, the piston is forced upwardly by pressure fluid at drain pressure $P_b$ admitted into the cavity from the chamber 21 through a passage 41 in the casing 11. It will be noted that the piston 37 is not mechanically connected to the valve 16 and thus movement of the piston effects a change in the volume of the chamber 24 without mechanically changing the position of the valve.

With the foregoing arrangement, an increase in compressor inlet temperature results in the valve 16 being moved downwardly toward a closed position by the gas in the bellows 31 to increase the control pressure $P_6$ and the feedback pressure $P_{61}$. As the feedback pressure tends to increase, the piston 37 is forced downwardly to increase the volume of the chamber 24 and permit flow to occur between the passage 20 and the chamber through the restriction 35 in the passage 34. As a result of the pressure drop created by the flow through the restriction, the feedback pressure $P_{61}$ initially increases at a slower rate than the control pressure $P_6$. Accordingly, the restoring force imposed on the valve 16 by the feedback pressure initially increases at a slower rate than is the case when the restriction 34 and the piston 37 are absent and thus the control pressure $P_6$ responds more quickly to an increase in compressor inlet temperature.

The control pressure $P_6$ will continue to increase with rising compressor inlet temperature until such time as the temperature reaches a steady state value. When the spring 40 is compressed sufficiently that its force and the force exerted upwardly on the piston 37 by the pressure $P_b$ balance the downward force exerted by the feedback pressure $P_{61}$, flow through the restriction 35 ceases and thus the feedback pressure rises to a value equal to the control pressure $P_6$ to hold the valve 16 in a steady state position. Because of the lag in the feedback pressure, the control pressure will momentarily overshoot the compressor inlet temperature but will assume a magnitude correlated with such temperature as soon as the feedback pressure equalizes.

A similar but reverse action occurs when the compressor inlet temperature decreases. The feedback pressure $P_{61}$ reduces and again initially changes at a slower rate than the control pressure $P_6$ or, stated differently, the control pressure leads the feedback pressure and, because of the flow through the restriction 35, the amount of lead is proportional to the rate of change in the control pressure $P_6$ squared. The amount of lead can be varied by changing the effective area of the restriction 35, the effective area of the upper face 36 of the piston 37 and the spring rate of the spring 40.

Because the response characteristics of the sensor 10 are improved by retarding changes in the hydraulic feedback pressure $P_{61}$, the restriction 35 can be made large in comparison to, for example, a restriction which causes a pressure drop in a flow of gas. As a result, the restriction 35 is not likely to become clogged by foreign matter and thus the sensor is relatively trouble-free in operation. Also, the volume of gas in the tube 33 may be kept large relative to the volume of gas in the receiving bellows 31. This helps minimize the effect on the sensor 10 of changes in the temperature of the fuel located in the chamber 24 and surrounding the bellows 31.

Figure 2:
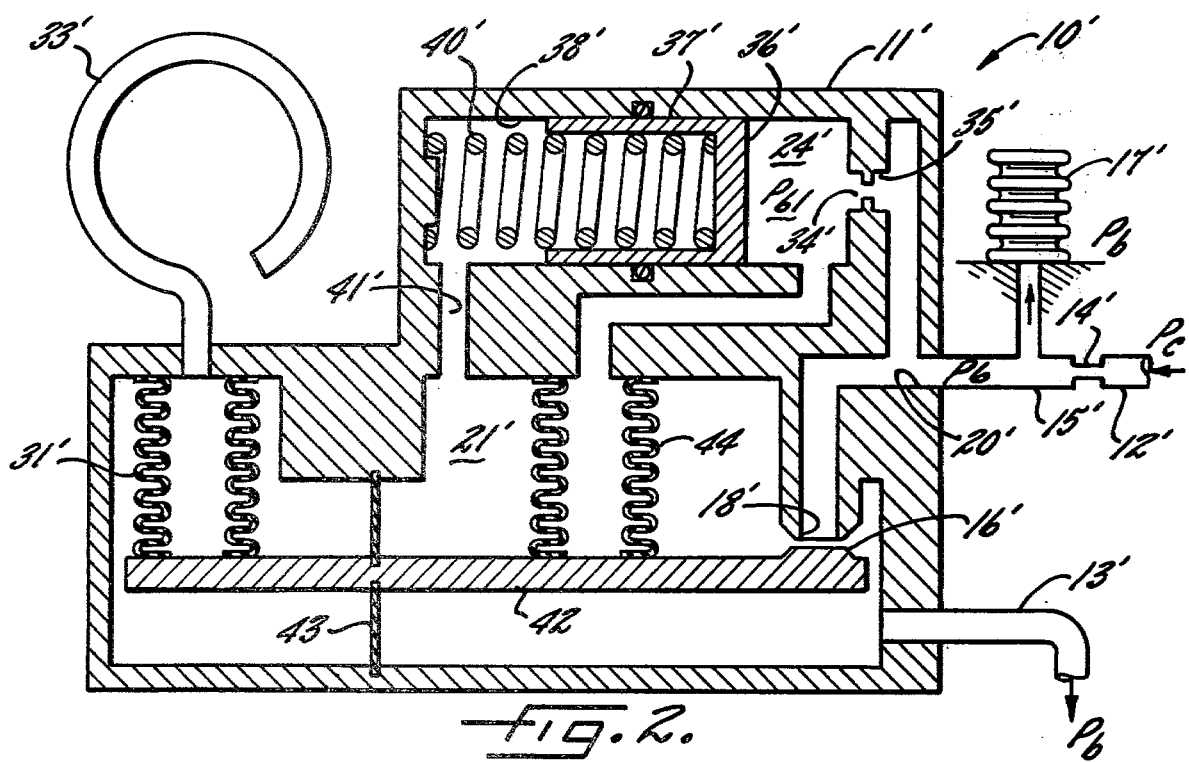
FIG. 2 is a view similar to FIG. 1 but shows a modified embodiment of the apparatus.

Another embodiment of a compressor inlet temperature sensor 10' is shown in FIG. 2 in which parts corresponding to those of the first embodiment are indicated by the same but primed reference numerals. The sensor 10' is functionally equivalent to the sensor 10 but employs a valve 16' which is more nearly similar to the valves of sensors which are in wide present day use.

As shown in FIG. 2, the valve 16' is carried on one end of a generally horizontal beam 42 disposed within the casing 11 and pivotally supported intermediate its ends by a flexible diaphragm 43. When the beam is pivoted in a counterclockwise direction, the valve 16' tends to close off a port 18' defined at the end of a passage 20' which communicates with the line 15' so as to contain pressure fluid at control pressure $P_6$. The portion of the beam located to the right of the diaphragm 43 is disposed within a chamber 21' which communicates with the line 13' and which thus resides at drain pressure $P_b$.

A bellows 31' is sealed between the casing 11' and the upper side of the opposite end of the beam 42 and communicates with a gas-filled tube 33'. Thus, the gas in the bellows 31' expands and pivots the beam counterclockwise to close the valve 16' and increase the control pressure $P_6$ when compressor inlet temperature increases. The force exerted by the gas in the bellows 33' is opposed by pressure fluid in a feedback bellows 44 located on the opposite side of the diaphragm 43 and sealed between the casing and the upper side of the beam. The feedback bellows communicates with a chamber 24' which, in turn, communicates with the passage 20' by way of a passage 34' having a restriction 35' therein. A piston 37' is slidably mounted in a cavity 38' in the casing 11' and is biased to the left by the feedback pressure $P_{61}$ in the chamber 24'. The piston 37' is biased in the opposite direction by a spring 40' and by the force exerted by the pressure $P_b$, the cavity 38' communicating with the chamber 21' by way of a passage 41'.

As before, an increase in compressor inlet temperature effects closing of the valve 16' to increase the control pressure $P_6$. Because of the restriction 35' and the piston 37', however, the feedback pressure $P_{61}$ in the bellows 44 does not immediately increase at the same rate as the control pressure but instead initially lags the control pressure so that the latter responds more quickly to the change in temperature and reaches a steady state value in a shorter period of time. The feedback pressure also initially lags the control pressure when the compressor inlet temperature decreases.

The present invention also contemplates the provision of control apparatus 50 (FIG. 3) adapted to be added to or retrofitted with presently used compressor inlet temperature sensors in order to decrease the response time thereof. As a result of the apparatus 50, an existing standard sensor need not be replaced or rebuilt in order to gain the advantages afforded by the present invention.

A typical standard sensor 10" is shown in FIG. 3 and is generally similar to the sensor 10' of FIG. 2. Accordingly, the parts of the standard sensor have been indicated by the same but double primed reference numerals. It will be seen that the sensor 10" is the same as the sensor 10" except that it lacks elements corresponding to the restriction 35' and the piston 37'. Accordingly, the feedback pressure of the sensor 10" does not lag the control pressure and thus the sensor 10" does not possess the fast response characteristics of the sensor 10'.

The apparatus 50 for improving the response time of the sensor 10" includes a casing 51 which may be mounted on or adjacent to the casing 11" of the sensor. The casing 11" is formed with a passage 52 which may be connected either to the passage 20" in the casing 11" or to the line 15". In addition, the casing 51 is formed with a passage 53 communicating with a line 54 which, in turn, communicates via a restriction 55 with a line 56 adapted to receive fuel at a regulated constant supply pressure $P_c$.

As will be explained subsequently, the sensor 10" causes the pressure $P_{62}$ of the fluid in the passage 20" to change as a function of variations in compressor inlet temperature. The pressure $P_{62}$, however, is not used as the control pressure during transient conditions but instead the pressure $P_6$ in the passage 53 and the line 54 is relied upon for control purposes. Thus, an output bellows 57 communicates with the line 54.

As shown in FIG. 3, the passages 52 and 53 communicate with the left and right ends, respectively, of a stepped diameter bore 58 which is formed in the casing 51. Slidably disposed in the bore is a valve piston 60 whose left end 61 is adapted to seat against the left end of the bore and whose right end 62 defines a valve face adapted to regulate the pressure drop from the passage 53 to the passage 52 through a passage 63 formed through the center of the valve. The area of the left end 61 of the valve 60 is somewhat greater than the area of the right end 62 thereof.

The passage 52 also communicates with a feedback chamber 64 in the casing 51 by way of a passage 65 having a restriction 66 therein. A piston 67 is disposed slidably in a cavity 68 in the casing and includes a face 69 which is exposed to the pressure $P_{61}$ in the chamber 64, such pressure biasing the piston to the right. The piston is biased in the opposite direction by a coil spring 70 and by fuel admitted into the cavity at drain pressure $P_b$ through a passage 71 and a line 72.

In carrying out the invention, the pressure in the chamber 64 also acts against the valve 60. For this purpose, an annular groove 73 is formed around the valve 60 intermediate the ends thereof and communicates with the chamber 64 via a passage 74. The left end wall 75 of the groove has a greater area than the right end wall 76 of the groove and thus the pressure in the chamber 64 biases the valve toward the left.

In operation, pressure fluid flows from the supply line 56 to the passage 53, past the valve face 62, through the passage 63 in the valve 60, out of the passage 52 and into the passage 20". The pressure fluid flows past the valve 16" of the sensor 10" and, since such valve is positioned in accordance with the compressor inlet temperature, the pressure $P_{62}$ in the passages 20" and 52 is proportional to that temperature. As long as the compressor inlet temperature is at a steady state value, the valve 60 is fully open as shown in FIG. 3 and is positioned with its left end 61 seated against the casing 51. Under steady state conditions, the control pressure $P_6$ in the passage 53 is equal to the pressure $P_{62}$ in the passage 52. The feedback pressure $P_{61}$ in the chamber 64 also is equal to the pressure in the passage 52.

When the compressor inlet temperature increases, the valve 16″ of the sensor 10″ closes to increase the pressure $P_{62}$ in the passage 52. The increased pressure $P_{62}$ acts against the left end 61 of the valve 60 to shift the valve to the right to a more nearly closed position and raise the control pressure $P_6$ above the pressure $P_{62}$.

The feedback pressure $P_{61}$ in the chamber 64 acts against the left end wall 75 of the groove 73 around the valve 60 and tends to re-open the valve. The feedback pressure $P_{61}$, however, initially increases at a slower rate than the pressure $P_{62}$ in the passage 52 because of the flow occurring through the restriction 66 as permitted by the piston 67. Thus, the feedback pressure $P_{61}$ is retarded to cause the control pressure $P_6$ to rise above the pressure $P_{62}$ in the passage 52. Shortly after the pressure $P_{62}$ reaches a steady state value, the feedback pressure $P_{61}$ becomes equal to the pressure $P_{62}$ and shifts the valve 60 back to the left to seat the left end 61 of the valve against the casing 51.

While the control apparatus 50 causes the control pressure $P_6$ to lead the feedback pressure $P_{61}$ in response to an increase in compressor inlet temperature, it does not improve the response time when compressor inlet temperature decreases. That is to say, the valve 60 does not move to the left when the pressure $P_{62}$ in the passage 52 decreases and thus the control pressure $P_6$ stays the same as the pressure $P_{62}$. In a fuel control, however, it is more important to increase the control pressure $P_6$ rapidly in response to increasing compressor inlet temperature than in response to decreasing temperature and thus the inability of the apparatus 50 to improve the response time when a temperature reduction occurs is not particularly significant.

I claim:

1. Temperature responsive control apparatus comprising a first source of fluid whose pressure changes as a function of variations in temperature, a second source of fluid for producing a control signal, a pressure responsive valve acted upon by said first fluid source and movable to different positions in response to changes in the pressure of said first fluid source, said valve being operable when moved to different positions to change the pressure of said second fluid source, a chamber containing pressure fluid which acts on said valve in opposition to said first fluid source to create a feedback pressure, a passage establishing communication between said chamber and one of said fluid sources, means mechanically independent of the effective position of said valve and causing the volume of said chamber to increase and decrease when the pressure of said one fluid source increases and decreases, respectively, thereby to permit flow to occur between said chamber and said one fluid source by way of said passage, and a fixed restriction in said passage to cause a pressure differential to result when flow occurs through said passage whereby the feedback pressure created by the fluid in said chamber changes at a different rate than the pressure of said one fluid source when the latter pressure changes as a result of temperature variations.

2. Temperature responsive control apparatus as defined in claim 1 in which said valve is mounted for back and forth reciprocation.

3. Temperature responsive control apparatus as defined in claim 1 in which said valve is mounted for back and forth pivoting.

4. Temperature responsive control apparatus as defined in claim 1 in which said first source of fluid is a gas and in which said second source of fluid is a liquid.

5. Temperature responsive control apparatus as defined in claim 4 in which said passage establishes communication between said chamber and said second source of fluid.

6. Temperature responsive control apparatus as defined in claim 1 in which both of said sources of fluid are liquid, said passage establishing communication between said chamber and said first source of fluid.

7. Temperature responsive control apparatus comprising a temperature probe having an internal volume filled with gas and exposed to a variable temperature condition to be sensed whereby the pressure of the gas changes as a function of variations in the sensed temperature, a source of pressurized liquid for producing a control signal, a pressure responsive valve acted upon by said gas and movable to different positions in response to changes in the pressure of said gas, said valve being operable when moved to different positions to change the pressure of said pressurized liquid, a feedback chamber containing pressure fluid which acts on said valve in opposition to said gas to create a feedback pressure, a passage establishing communication between said chamber and said source of pressurized liquid, said feedback chamber being defined in part by a wall which can be moved without mechanically changing the effective position of said valve, said wall moving and causing the volume of said feedback chamber to increase and decrease when the pressure of said source of pressurized liquid increases and decreases, respectively, thereby to permit flow to occur between said chamber and said source by way of said passage, and a fixed restriction in said passage to cause a pressure differential to result when flow occurs through said passage whereby the feedback pressure created by the fluid in said chamber changes at a different rate than the pressure of said pressurized liquid when said valve is moved as a result of the pressure of said gas changing in response to temperature variations.

8. Temperature responsive control apparatus as defined in claim 7 in which said wall is defined by the face of a piston, said piston moving in a direction to increase the volume of said chamber when the pressure of the fluid in the chamber tends to increase, and means biasing said piston in the opposite direction to cause said piston to reduce the volume of said chamber when the pressure of the fluid in the chamber tends to decrease.

9. Temperature responsive control apparatus as defined in claim 8 further including a port establishing communication between said source of pressurized liquid and a low pressure source, said valve changing the effective area of said port when the valve is moved to different positions, a second piston mounted to reciprocate in said chamber and carrying said valve, said gas acting against one face of said second piston, and the pressurized fluid in said chamber acting against the opposite face of said second piston and against said face of said first piston.

10. Temperature responsive control apparatus as defined in claim 8 further including a port establishing communication between said source of pressurized liquid and a low pressure source, said valve changing the effective area of said port when the valve is moved to different positions, a pivotally mounted beam carrying said valve, said gas acting against one end portion of said beam to pivot said beam in one direction, and the pressurized fluid in said chamber acting against the other end portion of said beam to pivot the beam in the opposite direction and also acting against said face of said piston.

11. Temperature responsive control apparatus comprising a temperature probe having an internal volume filled with gas and exposed to a variable temperature condition to be sensed whereby the pressure of the gas changes as a function of variations in the sensed temperature, a first source of pressurized liquid, a first pressure responsive valve acted upon by said gas and movable to different positions in response to changes in the pressure of said gas, said valve being operable when moved to different positions to change the pressure of said pressurized liquid, a first chamber containing said pressurized liquid with the liquid in the chamber acting on said valve in opposition to said gas to create a feedback pressure on said valve, the improvement in said apparatus comprising, a second source of pressurized liquid for producing a control signal, a second pressure responsive valve establishing communication between said first and second sources, said second valve being acted upon in one direction by said first source and in the opposite direction by said second source and being movable to different positions in response to increases in the pressure of said first source, said second valve being operable when moved to different positions to change the pressure of said second source, a second chamber containing pressure fluid which acts on said second valve in opposition to said first source, a passage establishing communication between said chamber and one of said sources, said second chamber being defined in part by a wall which can be moved without mechanically changing the effective position of said second valve, said wall moving and causing the volume of said second chamber to change when the pressure of said one source changes thereby to permit flow to occur between said second chamber and said one source by way of said passage, and said passage being restricted to cause a pressure differential to result when flow occurs through said passage whereby the pressure created by the liquid in said second chamber changes at a different rate than the pressure of said one source.

12. Temperature responsive control apparatus as defined in claim 11 in which the source which communicates with said second chamber is said first source.

13. Temperature responsive control apparatus as defined in claims 11 or 12 in which said second valve is a piston having one end portion which is acted upon by said first source, having a second end portion which is acted upon by said second source and having an intermediate portion which is acted upon by the liquid in said second chamber.

14. Temperature responsive control apparatus as defined in claim 13 in which the intermediate portion of said second valve is defined by an annular groove having two end walls with different areas.

15. Temperature responsive control apparatus as defined in claim 14 in which the end wall with the largest area is located such that said valve tends to be moved toward an open position when fluid pressure is exerted against said end walls.

16. Temperature responsive control apparatus as defined in claim 11 or 12 in which said wall is defined by the face of a piston, said piston moving in a direction to increase the volume of said second chamber when the pressure of the liquid in the second chamber tends to increase, and means biasing said piston in the opposite direction to cause said piston to reduce the volume of the second chamber when the pressure of the liquid in the second chamber tends to decrease.

* * * * *